Oct. 17, 1944.  E. M. KELLY ET AL  2,360,811
PURIFICATION OF LIQUIDS
Filed Sept. 18, 1941
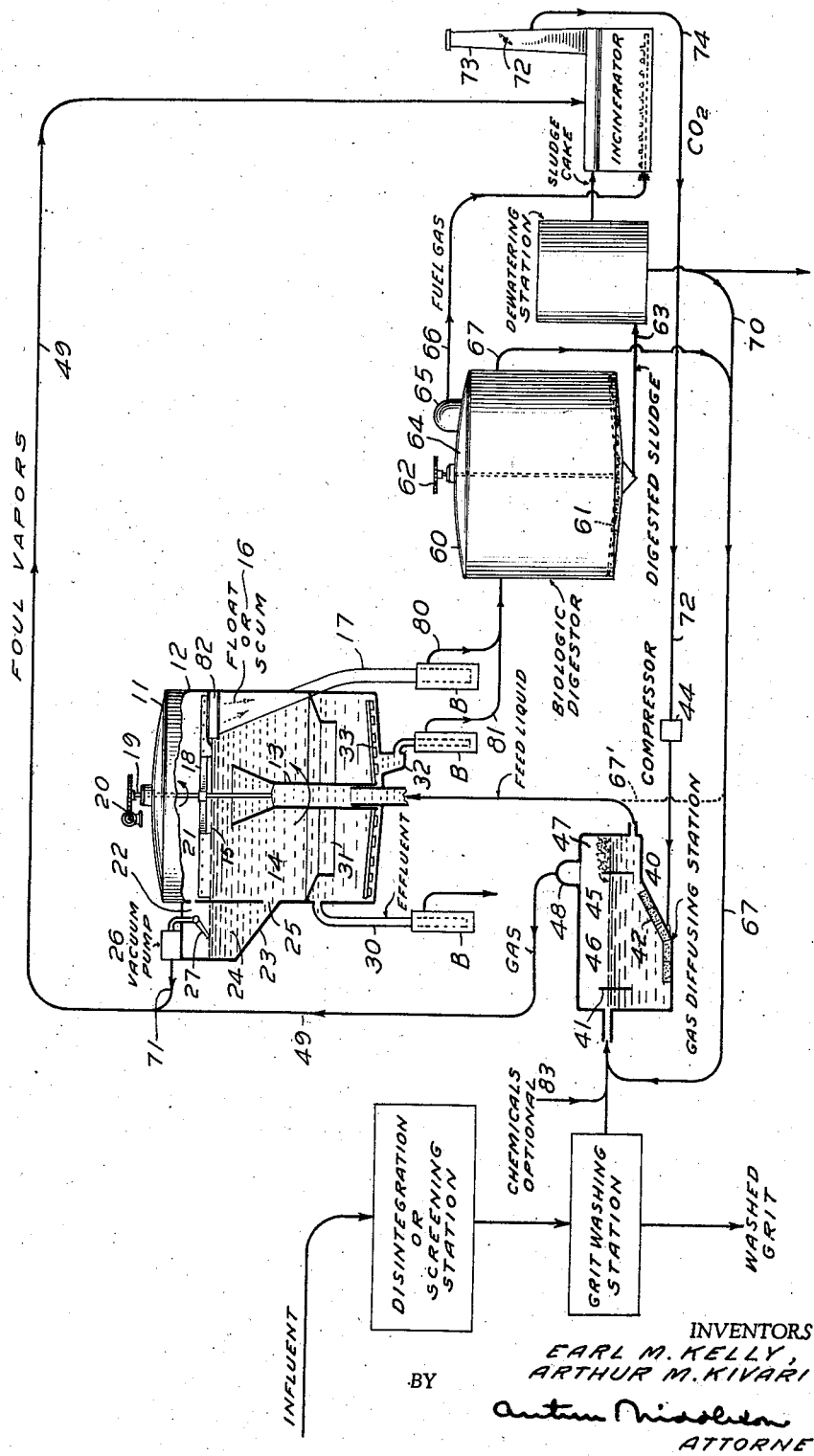
INVENTORS
EARL M. KELLY,
ARTHUR M. KIVARI,
BY
[signature]
ATTORNEY.

Patented Oct. 17, 1944

2,360,811

UNITED STATES PATENT OFFICE 2,360,811

PURIFICATION OF LIQUIDS

Earl M. Kelly and Arthur M. Kivari, Los Angeles, Calif., assignors to The Dorr Company, Inc., New York, N. Y., a corporation of Delaware Application September 18, 1941, Serial No. 411,268

4 Claims. (Cl. 210—2)

This invention relates to the treatment of liquid suspensions wherein the suspended matter includes material of organic nature that is septical so that they are required to be separated from their carrying liquor and subjected at least to biologic digestion treatment. Such suspensions include sewage as well as trade and industrial wastes that are exemplified by cannery and dairy wastes.

More particularly the invention involves generally the removal of larger floating solids in the sewage or other waste liquid followed by diffusing gas therein, subjecting the gas containing liquid to the effect of vacuum for facilitating the separation from the liquid of foul vapors and of suspended solids, subjected the separated solids to biologic digestion, dewatering digested sludge resulting therefrom, burning or drying the dewatered sludge cake in a heat treatment zone that may be fired at least partially by fuel gas that results from biologic action in the digester, and also possibly burning foul vapor separated from the sewage or other waste in this processing treatment.

Objects of this invention include the bringing about of the separation of suspended material of the sewage or waste liquid in an efficient manner under conditions where the apparatus for so doing occupies a minimum of ground space; is covered so that the unsightly and odorous material is not open to the atmosphere or to view; discharges an effluent that is relatively free of turbidity or suspended particles; that separates foul vapors from the sewage so they can be rendered innocuous such as by chlorination but more especially by heat treatment, fuel for which is derived from digester gas; and in which the suspended matter separated therein from their liquid menstruum are rendered particularly susceptible to subsequent treatment provided for them.

Other objects are to improve digestion of sludge from sewage or other septical wastes by delivering to a biologic digester a better digesting sludge than heretofore. By the use of a vacuum apparatus of the type herein described, the scum or "float" of floated particles passed from the vacuum apparatus to the digester is thicker or contains a higher percentage of solids than the sludge that is usually sent to a digester from a clarifier or other sedimentation apparatus.

A further object is to provide adjustment means associated with the vacuum apparatus by which the dewatering or condensing or thickening of the scum or float removed from the vacuum apparatus can be controlled and varied.

Still another object is to improve the treatability of the supernatant discharging from the digester, especially as to the separation therefrom of gas, odors and floatable material.

And a still further object is to condition the sediment derived from the vacuum flotation apparatus to have greater filterability than sediment from an ordinary clarifier or sedimentation apparatus.

In order to realize at least some of these objects it is proposed to subject gas containing sewage or other such septical waste liquid to treatment in a liquid holding closed tank characterized by means for providing the effect of vacuum on its liquid; means for maintaining and controlling liquid level in the tank; means for impelling feed liquid into the tank to the liquid level thereof; means for removing floating scum from the liquid; and means for discharging treated effluent therefrom. It may also be desirable to have the tank provided with means for removing therefrom settled solids or sediment composed thereof. All liquid outlets from the tank are provided with a barometric leg or its equivalent to prevent air-leakage therethrough that would otherwise affect the degree of vacuum maintained on the tank liquid.

The removed scum or float is subjected to treatment in the digester while digester supernatant is returned to a point in the plant ahead of the vacuum apparatus whereby suspended solids and vapors of the supernatant are separated therefrom in the vacuum flotation apparatus. Gas that is inert to the biochemical oxygen demand of the sewage can be supplied for gassing the incoming liquid ahead of the vacuum apparatus by using stack gases or carbon dioxide from the stack of the incinerator or flash dryer wherein digested sludge is burned due to heat treatment that makes use of digester gas as fuel.

The liquid passing to the vacuum apparatus for separation treatment therein must be gas containing. That is, when under the effect of vacuum in the apparatus, the lessened pressure causes minute bubbles of gas in the liquid to grow and in growing they rise, meanwhile attaching themselves to and thus causing to float to the surface of the liquid those solids to which they have attached themselves. If the liquid does not normally contain enough gas for this purpose, as it rarely does, gas must be supplied thereto, which it is proposed to do in a gas diffusing station ahead of the vacuum flotation apparatus. Gas is most effective for flotation purposes when it is present in the liquid in the form of infinitesimal if not microscopic bubbles. To that end, it is proposed to provide in the lower section of the gas diffusing station porous tiles or plates of granular material capable of diffusing a gas passed therethrough under pressure such as from a source of compressed gas.

Sewage usually contains grit that readily settles out therefrom. However, it usually is contaminated with septical organic material of the sewage. The grit can be washed substantially free of these contaminating organics by conveying the grit to emergence whereupon the organics are left in the sewage. If this washing be done ahead of the vacuum apparatus, the organic residue left in the sewage can well be handled by that apparatus and therein separated from the sewage liquid in the form of floating scum which can then be passed from the apparatus to digestion and further disposal treatment.

Therefore, it has been found that if a vacuum flotation apparatus of the general type described herein be used in the relationships shown with other associated apparatus, cumulative advantages are realized since each succeeding apparatus is enabled to function more efficiently and dependably.

This invention can be embodied in many modifications of the machines described herein, but there has been chosen for illustrative purposes the best embodiment of the invention now known so it should be understood that the invention can be practiced in varying apparatus so long as that apparatus, or the steps they carry out, fall within the ambit of the appended claims.

The embodiment chosen for example, is illustrated in the accompanying drawing, in which the sole figure is a diagrammatic or symbolic showing of the stations or of the particular apparatus used, with piping shown merely by single lines and no attempt has been made to show valves in the pipe lines for it is believed their use is obvious to one skilled in the art.

In the drawing, legends have been applied to the stations and apparatus as far as possible but for more informative description, reference numerals have also been used. Referring to those numerals, and referring to the vacuum flotation apparatus first, 11 indicates diagrammatically a machine of the type described in U. S. A. patent application of Kelly et al., Ser. No. 399,058, filed June 21, 1941, wherein 12 indicates a gas-tight tank into which liquid suspension or a liquid-solids mixture flows through draft-tube 13 from whence it is emitted into a liquid body 14 in the tank 12 in the region of the liquid level 15 thereof. Adjacent the liquid level is the upper terminal of a scum or "float" removal means that includes a hopper 16 and a conduit or pipe 17 leading to the outside of the tank.

Also adjacent the liquid level is a scum impelling means 18 for sweeping scum into the hopper 16. The means 18 may comprise rotatable arms supported from a shaft 19 rotated by suitably motivated gear 20. Above the liquid level in the tank is a gas holding space 21 that communicates with a gas holding space 22 in a chamber or compartment 23 that holds liquid or an auxiliary body of liquid 24 that is in hydraulic communication at 25 with the liquid body 14 in the tank at a level substantially below that of the floating scum in the tank. 26 represents a vacuum or suction pump that sucks air or gas from the auxiliary compartment 23 through an adjustable nozzle or terminal pipe 27 that is pivotally adjustable preferably about a horizontal axis. The purpose of this is to control the elevation of the liquid level in the compartment 23 and through it, the liquid level 15 in the tank. The control of or capability of varying the elevation of the liquid level of the tank is a feature of this arrangement although the essential function is to control or vary the relative height between the liquid level 15 and the effective height of the scum removal means represented by the hopper 16.

Clarified effluent or liquid from which suspended solids have been separated passes from the tank through effluent discharge pipe 30, drawn from the tank in a region associated with baffle means 31 that terminates in a section of the tank liquid 14 wherein there is substantially a minimum of suspended solids. Non-floatable solids tend to settle on the tank bottom in the form of sediment or sludge from whence they may be impelled to sludge sump 32 that includes an outlet pipe, by means of sludge impelling arms 33 that can be rotated with the draft tube 13 from the shaft 19. 13 represents a barometric leg or its equivalent associated with each discharge pipe such as scum pipe 17, effluent pipe 30 and sludge pipe 32. The barometric leg is for the purpose of discouraging air-leakage through the outlet pipes. In this vacuum apparatus, it is to be noted that the effluent is drawn from the tank in a region that is functionally remote from which the feed liquid is emitted or released from the draft-tube 13 into the tank liquid 14, and is also functionally remote from the scum removal means 16.

Liquid suspension in order to be effectively treated in the vacuum flotation apparatus 11 should contain gas, so in the event that the incoming feed liquid does not contain sufficient gas, or of the right phase the incoming liquid prior to reaching the vacuum flotation apparatus is passed through a gassing or gas diffusing station comprising a basin or tank 40 provided with a curtain baffle 41 or other means for preventing short circuiting. The basin is equipped with some aerating means. The aerating or gassing means may be relatively gentle in its effect under which circumstances there is indicated the use of means such as porous tiles or plates 42 of granular material in the bottom section thereof connected by pipes 43 to a gas compressor 44. Compressed gas, or gas under pressure in passing through the porous tiles or plates 42 is emitted into the liquid 45 thereabove in the form of very small or infinitesimal bubbles which become entrained in the liquid. However, some larger bubbles will form and these should be removed from the liquid as they interfere with the vacuum treatment. They tend to leave the liquid and are caught in the gas collecting space 46 especially in the large bubble eliminating section or degassing zone 47 of the gas diffusing station. Foul vapors of the liquid being treated also tend to leave the liquid, at least to some extent, so they also are caught in the gas collecting space 46 from whence collected gases are removed through dome 48 and pipe 49. For the gentle aeration of the porous tiles 42, certain conditions may indicate that there can well be substituted shorter and rapid gassing by an aerating impeller or propeller—in which case the compressor 40 could also be eliminated. (An arrangement shown in said patent application 399,058.) The latter is believed to be more efficient under most conditions, but in sewage treatment where aeration is commonly done by the use of porous tiles, sanitary engineers seem to prefer the gentler type.

Influent liquid incoming for treatment may be given pretreatment ahead of the vacuum apparatus 11, or of the gas diffusing station in the event one is used. Such pretreatment should be at least in a screening or disintegrating station wherein the larger solids are comminuted or disintegrated into solids that are small enough to be amenable to the vacuum treatment, or, wherein such large solids are separated and removed from the liquids passing to vacuum treatment. A second station is optional, namely a grit washing station.

Most waste liquids, and especially sewage, contain readily settleable or relatively heavy sand or grit of inorganic nature. This becomes coated or contaminated with septical organic material. If the grit be removed from the sewage while containing these organics, the latter become septic after a time and make the grit odorous and otherwise objectionable. Thus while the grit is rather easy to remove from the sewage, it is not so easy to remove the organics from the grit. However, the removal of the organics from the grit can be accomplished satisfactorily and the rejected organics left in or returned to the flowing sewage, for example, by using the process or apparatus of the patents to Weber No. 1,933,636 of Dec. 12, 1933, and No. 1,997,161 of April 9, 1935, that are characterized by conveying the grit upwardly along a partially inclined deck from submergence to emergence when it is found that upon passing the liquid level the organics are rejected from emergence and the grit emerges in a washed condition.

Following the vacuum flotation apparatus 11 there is provided a biologic digester comprising a gas-tight tank 60 in larger sizes of which may operate sediment or sludge impelling arms 61 rotated by some motivated means such as gearing 62 for impelling digested and settled sludge to discharge through pipe 63. Since the digester functions incident to biologic activity, the sludge rakes may have substituted therefor other means for drawing off sludge from the digester. The digester has a gas collecting space 64 from which digester gas (largely methane) evolved incident to biologic digestion, can be withdrawn through gas-dome 65 by pipe 66. Digester supernatant liquor can be drawn off by pipe 67. Supernatant liquor is preferably conveyed or return to the incoming feed liquid suspension ahead of the gas diffusing station where it is mixed and mingled with the influent or newly incoming feed liquid, although if it contains inherently enough gas for vacuum flotation purposes it can be bypassed through pipe 67 directly to the vacuum apparatus 11. Digested sludge is passed either continually or intermittently as desired to a sludge dewatering station.

The dewatering station preferably comprises sludge filtering equipment and means for adding to the sludge prior to filtration, coagulating chemical or other filter-aid. Or a centrifuge, especially of the solid bowl type, as manufactured by Bird Machine Co., of Walpole, Mass., may be substituted for a filter. Filtrate from this station passes therefrom through pipe 70 which preferably joins digester supernatant pipe 67 and through it is returned to ahead of the gas diffusing station. Filtered sludge cake is passed from the dewatering station to a place of heat treatment such as a flash dryer or incinerator which is preferably heated by the use as fuel of digester gas from pipe 66. Foul vapors from the degassing zone 47 through pipe 49 and similar vapors exhausted from vacuum pump 26 through pipe 71 that can join pipe 49, are deodorized or rendered innocuous in the flash dryer or incinerator. A damper or other collecting means 72 can be provided in the stack 73 of the incinerator which permits stack gases and especially carbon dioxide to be conveyed through pipe 74 to compressor 44 for use as the compressed gas supplied to the porous tiles 42 for emission therethrough into the liquid 45 in the gas diffusing station. Obviously, air can be supplied to the compressor should it not be desired to use $CO_2$.

80 represents a pipe for conveying discharged scum or float to the biologic digester, and pipe 81 indicates a pipe for conveying sediment or sludge also to the digester. 82 indicates a ramp leading from below the minimum liquid level 15 in the tank 12 up to the entrance edge of the hopper 16, up along which the scum sweeping arms 18 push scum from its floating position into the hopper.

83 indicates the optional feeding of chemicals to the sewage or other liquid to be treated at a point ahead of the gas diffusing station. If chemicals are used their purpose is to coagulate or agglomerate suspended solids and especially smaller and possibly colloidal solids into integrated larger solids so that they may be more amenable to the vacuum flotation treatment. Chemical may also be added here for another reason, namely, the liquid to be treated may contain constituents that should be removed but which are in liquid phase. A chemical may be used here that causes a chemical reaction with that constituent that results in the precipitation of solid phase material that is then amenable to the vacuum flotation treatment. Such chemicals are represented by alum and ferric chloride. If chemicals are not added to the liquid ahead of the gassing station, the gassing period can be short and violent. The time or period of detention of the liquid in the gassing station can be as short as 5 minutes based on average flow. On the other hand, if chemicals be added ahead of the gassing station, the gassing should be relatively gentle and the detention period may require as long as from 15 to 20 minutes. The volume of gas required by the liquid ranges from 0.02 to 0.05 cubic feet per gallon.

Where no chemicals are added, and the gassing agitation can be violent, an impeller aerator can be used in the gas diffusing station instead of the tiles shown in the drawing. But where chemicals are used, the tile type of gentle gassing is desired so that the flocs effected by the coagulating properties of the chemicals are fragile so it is desired not to break them up any more than is necessary. The capacity of the vacuum flotation apparatus 11 ranges normally from 5,000 to 10,000 gallons per square foot of liquid surface per twenty-four hours, based upon average flow. Although in treating some cannery wastes the gallonage may go below 5,000 and in other applications the top figure may be exceeded. The figure used depends upon the degree of solids removal or clarity of effluent required. Indeed, very much the same criterion applies to the use or non-use of chemicals. Where an extremely high degree of solids removal from the effluent is requisite, then the use of chemicals is indicated, but if not, then chemicals may be safely omitted.

Since the operation of the vacuum flotation apparatus 11 should be understood in order to appreciate the cumulative advantages to be derived from the associated equipment shown herein, let us describe its operation first, assuming for practical purposes that the vacuum apparatus 11 and the gas diffusing station are to be used as a unit. Influent liquid to be treated is preliminarily passed through a station wherein the larger solids are either screened out or reduced in size so that they are amenable to vacuum treatment. Thereupon the influent liquid suspensions enters the gas diffusing station where it is gassed. By gassed is meant that the liquid is provided with or has entrained therein a myriad of gas bubbles that are as small as they can be made, namely, infinitesimal or microscopic, for the smaller the bubble, the more effective it is in the subsequent vacuum flotation treatment. If the liquid does not have a particularly high oxygen demand, the gas used can be air, but if the liquid does have a high oxygen demand, some gas should be used that is substantially inert to that demand, and such a gas is carbon dioxide, or nitrogen, or a combination thereof, which possibly may contain some air. The preferred manner of gassing the liquid is to pass compressed gas through porous tiles or plates made of granular material of a nature that is inert to corrosion by the constituents of the sewage or other waste being treated. Such a method of gassing induces the bubbles provided in the liquid to be efficiently small. During such gassing, however, it is inevitable that some large bubbles form, so they are removed from the liquid in the de-gassing zone 47 of the gas diffusing station. The gas of these bubbles plus other gas and especially foul vapors are removed from the gas diffusing station through gas dome 48 and conveyed through pipe 49 to subsequent deodorizing treatment.

Gas containing liquid suspension is passed from the gas diffusing station as feed liquid for the vacuum apparatus 11 and is conveyed into that station through draft-tube 13, under the action of vacuum, from the upper terminal of which it is emitted or released into the body of liquid 14 maintained in the tank 12, in a region substationally adjacent the liquid level 15 thereof, the nearer thereto the better, so long as the momentum of the emitted liquid is substantially stilled before reaching the liquid level 15. The liquid level 15 (and to some slight extent the liquid therebelow) is under the effect of vacuum produced by the suction or vacuum pump 26, the degree of vacuum maintained thereon being equal to the order of from seven to nine inches of mercury. The effect of this vacuum is to cause to float and form into floating scum or "float" not only normally floatable suspended particles but certain normally non-floatable particles.

It is desired to remove the scum or float about as fast as formed so that there is no undue accumulation thereof, to which end scum removing means are provided that are embodied in rotating scum sweeping arms 18 that convey floating scum to and into a hopper 16 from whence the scum or float is conducted or discharged from the tank 12 through pipe 17 and its barometric leg B. Suspended solids that settle in spite of the vacuum effect, collect on the tank bottom in the form of sediment or sludge which, if desired, can be removed by the rotating sludge impelling arms 33 to discharge through sludge sump 32 and its connected pipe that also has a barometric leg B. Clarified effluent, or liquid that has had suspended solids separated therefrom in the vacuum tank 12, is passed from the tank through effluent discharge pipe 30 that is also provided with a barometric leg B. Pipe 30 draws effluent from the tank from a region wherein the liquid has a minimum of suspended solids, and the level from which the effluent is drawn is controlled by the baffle means 31, this region being functionally remote from that in which incoming feed is released into the tank and in which scum is removed.

It is desirable to be able to vary the liquid level 18 of the tank liquid 14 with relation to the effective level at which scum is passed into the hopper 16. The reason is that the higher the entrance level of the hopper is from the liquid level, the greater the distance scum has to be pushed up the ramp leading to the hopper entrance by the sweeping arms 18, with a consequent increasing dewatering of the scum. That is, in pushing scum from its floating position up the ramp into the hopper, water is squeezed therefrom, so the longer the period of pushing, the more water is squeezed therefrom. This is important, because the scum removed from the vacuum tank that is passed to the biologic digester should be concentrated as economically as possible. In the embodiment shon, the liquid level 15 is variable and controllable as to its height, while the ramp and hopper are fixed, although this relationship may be reversed. The control of the liquid level 15 is accomplished as follows: The tank 12 as provided is an auxiliary chamber or compartment 23 that has a gas holding space 22 that is in gas communication with the gas holding space 21 of the tank 12, while the liquid containing portion 24 of the chamber 23 is in hydraulic communication with the liquid body 14 in tank 12 by means of passageway 25. Thus the liquid level in the auxiliary chamber 23 and in the tank 12 are always substantially the same.

The vacuum pump 26 can suck gas or liquid, or both, from the chamber 23 through the pipe that terminates in the pivoted nozzle 27, depending upon the extent of submergence of the entrance of the nozzle in the liquid in the chamber 23. Assuming that the entrance to the nozzle 27 is fixed, if the liquid level in the chamber 23 rises above that point, the pump through the nozzle will suck liquid until the liquid level falls below the entrance to the nozzle and thus the liquid level in the chamber will be maintained at the level of the entrance to the nozzle. And, of course, so will the liquid level 15 of the tank 12 because the chamber 23 is in both gas and liquid communication with the tank. If, now, the entrance to the nozzle is either elevated or lowered, a new liquid level will be realized. Thus the elevation of the liquid level in the tank can be controlled or varied at will. The pump 26 in this embodiment is of the wet vacuum variety so that it will pump water when its nozzle 27 is submerged, or only gas when its nozzle is not submerged. Gas or foul vapors withdrawn from the gas holding spaces 21 of the tank 12 and 22 of the chamber 23 are exhausted into pipe 71 that can join pipe 49 (from the gas diffusing station) for conducting such vapors to chlorination or to deodorizing heat treatment, as for instance in the incinerator.

In this type of vacuum apparatus 11, about

40–60% of the suspended particles in a liquid suspension are separated therefrom. Indeed, in treating cannery wastes as much as 80% has been removed. These solids are discharged from the apparatus as scum or float. This scum plus sediment can be conducted from the tank 12 to a biologic digester by pipes 80 and 81 respectively. In the digester, the solids are subjected to biologic and bacterial action called in the art digestion, wherein the septical solids are largely converted by this action into a burnable gas, supernatant foul liquor and settleable digested solids. The burnable gas is collected in the gas holding space 64 of the digester and conducted therefrom through gas dome 65 and pipe 66 to the heat treatment station indicated by the incinerator, where the digester gas can be used as fuel. Digested sludge is impelled to discharge from the digester by rotating rakes or arms 61 from whence the digested sludge is conducted to a dewatering station. Here it has coagulating chemicals or filter-aid if required added thereto whereupon it is filtered, or otherwsie dewatered. Filter cake is then conducted to the incinerator or flash dryer where it is subjected to heat treatment for rendering it innocuous, while filtrate from the dewatering station is conducted back to ahead of the gas diffusing station through pipe 70, which may join pipe 67 that is provided for taking the foul digester supernatant liquid or liquor back to ahead of the gas diffusing station. This liquor has a content of foul gas and floatable suspended solids, so by returning it for further treatment in the vacuum apparatus 11, these undesirable constituents have their characteristics modified and changed.

Sometimes this supernatant liquid is so full of gas that it can be passed directly to the vacuum apparatus 11, by-passing the gas diffusing station, as indicated by dotted line 67'. The vapors and gas from the gas diffusing station, and from the vacuum pump 26 can be conducted by pipes 71 and 49 to the heat treatment station or incinerator where the heat of that station can be used to deodorize them. The carbon dioxide or other inert gases of the stack 73 of the incinerator can be conducted by pipe 72 to the compressor and this used as the inert gas to be supplied to the gas diffusing station.

In most flotation processes the liquid suspension has to be dosed with a frothing agent and in some cases also with a depressant, but in the vacuum flotation of sewage and the like wastes, it has been found that neither of these are necessary.

We claim:

1. The process of treating waste liquids having septical suspended particles which comprises maintaining under pressure less than atmospheric an encased body of liquid suspension by applying vacuum-effecting suction to the atmosphere encased with and overlying the liquid to produce a sub-atmospheric pressure at the surface of the liquid equal to more than six inches of mercury to reduce the gas content of the body, continually conveying and releasing into the liquid body gas-bearing feed liquid in a region and at a velocity so that suspended particles thereof are caught by the suction which is sufficient to carry them to the surface of the liquid and retain them thereat as scum, continually removing from the surface of the body scum of particles floating thereat conditioned to be compatible with anaerobic bacterial digestion, controlling the liquid level of the body, discharging clarified effluent drawn from a lower section of the body whereat there is a minimum of suspended solids and a substantially lessened degree of suction as compared with that at the liquid surface, which section is also functionally remote from the scum and from the region at which feed is released into the body, meanwhile passing removed scum and discharge effluent each through a closed pathway including a liquid-sealed leg for minimizing air-leakage therethrough to the liquid body, subjecting removed and conditioned scum to anaerobic biologic digestion, returning digester supernatant liquor for re-treatment in the encased body of liquid whereby to separate gas and suspended particles from the liquor, and discharging digested sludge from the place of its digestion.

2. Apparatus for the treatment of liquid having septical organic matter suspended therein which comprises a biologic digester providing a liquid holding section, means for discharging supernatant liquor therefrom that contains products of biologic digestion including floatable particles and foul vapors, means for discharging digested sludge from the digester, and in combination with the foregoing a vacuum flotation apparatus comprising a closed tank adapted to hold liquid being treated, means for controlling the liquid level in the tank, suction means for applying vacuum-effecting suction equal to more than 6 inches of mercury to the atmosphere encased with and overlying the liquid to produce a sub-atmospheric pressure at the liquid level to reduce the gas content of the body, means for continually conducting gas-bearing feed liquid to the body and releasing such feed adjacent the liquid level whereby gas-buoyed suspended matter is impelled into the reach of the pull of the suction used, the gas content of the feed and the degree of suction used being sufficient so that such released feed matter reaches and collects at the liquid level as floating scum, scum receiving and discharging means extending into the tank liquid adjacent the liquid level thereof for discharging scum whose air content has been minimized, scum impelling means associated with the scum discharging means, means for moving the scum impelling means, clarified effluent discharge means leading from a lower section of the tank whereat there is a lessened degree of suction as compared with that at the liquid level, means for minimizing substantial air-leakage into the tank through said discharges, conduit means for conducting such scum in a closed pathway to said digesters, and means for conducting supernatant liquor from the digester and for releasing such liquor into the tank liquid adjacent the liquid level thereof but in a region that is functionally remote from the clarified effluent discharge including a tube extending into the tank and terminating therein adjacent the liquid level of the tank.

3. Apparatus for the treatment of liquid suspensions which comprises a closed tank adapted to hold an ever-changing body of such liquid, feed means for submergedly releasing gas-bearing liquid into the body adjacent the liquid level, suction means for effecting on the liquid level of the body sub-atmospheric pressure equal to more than 6 inches of mercury the gas content of the feed and the degree of suction used being sufficient to impel feed liquid into reach of the suction and to collect suspended particles thereof at the liquid level as floating scum, scum-receiving and discharging means associated with the tank for discharging scum whose air content has been minimized, means for impelling scum into the latter means, discharge means for removing clarified effluent liquid derived from the lower section of the tank, and means for minimizing air leakage into the tank through said discharges; a biologic digester; and means for passing discharged de-aerated scum from the tank to the digester; said apparatus also having means for varying the liquid level in the tank with respect to the scum receiving and discharging means therein whereby there can be thus controlled the water content of the scum passing from the tank to the digester.

4. Apparatus for the treatment of liquid having septical organic matter suspended therein which comprises an anaerobic biologic digester adapted to hold a body of digestible sludge with a gas-holding space overlying the body, means for removing digested sludge from the digester, and means for removing from the digester supernatant liquor having therein products of anaerobic digestion including floatable particles and gas, and in combination with the foregoing a vacuum flotation apparatus comprising a closed tank adapted to hold a liquid suspension to be treated and to provide a gas-holding space overlying the liquid, means for controlling the liquid level therein, suction means for applying vacuum-effecting suction to produce sub-atmospheric pressure equal to more than 6 inches of mercury at the liquid level in the tank and for reducing the gas content of such suspension, means for continually conducting gas-bearing feed liquid to the body and releasing such feed adjacent the liquid level whereby gas-buoyed suspended matter is impelled into the reach of the pull of the suction used, the gas content of the feed and the degree of suction used being sufficient so that such released feed matter reaches and collects at the liquid level as floating scum, scum receiving and discharging means extending into the tank liquid adjacent the liquid level thereof for discharging scum whose air content has been minimized, means for sweeping scum into said scum receiving means, clarified effluent discharge means leading from the tank, means for minimizing substantial air-leakage into the tank through said discharges, conduit means for conducting such discharged scum to said digester, gas-diffusing means for feed liquid going to the vacuum tank, means for conducting supernatant liquor from the digester to the gas-diffusing means, and means for conducting feed liquid after it has passed the gas-diffusing means to and for release into the vacuum tank adjacent the liquid level therein.

EARL M. KELLY.
ARTHUR M. KIVARI.